US011412000B2

(12) United States Patent
Khouderchah et al.

(10) Patent No.: US 11,412,000 B2
(45) Date of Patent: Aug. 9, 2022

(54) LIGHTWEIGHT DISTRIBUTED APPLICATION SECURITY THROUGH PROGRAMMABLE EXTRACTION OF DYNAMIC METADATA

(71) Applicant: Cisco Technology, Inc., San Jose, CA (US)

(72) Inventors: Michel Khouderchah, Cupertino, CA (US); Jayaraman Iyer, Sunnyvale, CA (US); Kent K. Leung, Palo Alto, CA (US); Jianxin Wang, Saratoga, CA (US); Donovan O'Hara, Acton, MA (US); Saman Taghavi Zargar, Milpitas, CA (US); Subharthi Paul, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 222 days.

(21) Appl. No.: 16/741,794

(22) Filed: Jan. 14, 2020

(65) Prior Publication Data

US 2021/0218771 A1    Jul. 15, 2021

(51) Int. Cl.
*H04L 9/40* (2022.01)
*H04L 67/02* (2022.01)
*H04L 41/22* (2022.01)

(52) U.S. Cl.
CPC .............. *H04L 63/20* (2013.01); *H04L 41/22* (2013.01); *H04L 63/0876* (2013.01); *H04L 63/102* (2013.01); *H04L 67/02* (2013.01)

(58) Field of Classification Search
None
See application file for complete search history.

(56) References Cited

U.S. PATENT DOCUMENTS 9,185,125 B2    11/2015    Varsanyi et al.
10,037,617 B2    7/2018    Ebtekar et al.
(Continued)

OTHER PUBLICATIONS

Frenz, Christopher, "Cloud AV: Security At The Expense of Privacy?", International Association of Privacy Professionals, Sep. 23, 2016, 3 pages.
(Continued)

*Primary Examiner* — Kevin T Bates
*Assistant Examiner* — Emad Siddiqi
(74) *Attorney, Agent, or Firm* — Edell, Shapiro & Finnan, LLC (57) ABSTRACT

Presented herein are methodologies for implementing application security. A method includes generating an extraction vector based on a plurality of application security rules to be enforced, transmitting the extraction vector to a first agent operating on a first network device and to a second agent operating on a second network device; receiving, separately, from the first agent and from the second agent, first metadata generated by the first agent and second metadata generated by the second agent by the agents applying the extraction vector to network traffic passing, respectively, through the first network device and the second network device. The first metadata includes a transaction ID assigned by the first agent, and the second metadata includes the same transaction ID. The method further includes correlating the first metadata with the second metadata based on the transaction ID to construct a transactional service graph for the network traffic.

20 Claims, 7 Drawing Sheets

(56) References Cited

U.S. PATENT DOCUMENTS

| | | | |
|---|---|---|---|
| 10,462,031 B1* | 10/2019 | Nataraj | H04L 43/0882 |
| 2016/0191549 A1 | 6/2016 | Nguyen et al. | |
| 2016/0191973 A1* | 6/2016 | Joy | H04N 21/643 |
| | | | 725/75 |
| 2019/0081959 A1 | 3/2019 | Yadav et al. | |
| 2021/0136870 A1* | 5/2021 | Panchal | H04W 8/08 |

OTHER PUBLICATIONS

Erlacher, Felix et al., "FIXIDS: A High-Speed Signature-based Flow Intrusion Detection System", NOMS 2018-2018 IEEE/IFIP Network Operations and Management Symposium, IEEE, Apr. 2018, 8 pages.

* cited by examiner

LIGHTWEIGHT DISTRIBUTED APPLICATION SECURITY THROUGH PROGRAMMABLE EXTRACTION OF DYNAMIC METADATA

TECHNICAL FIELD

The present disclosure relates to network security, and more particularly to monitoring network operations for anomalies.

BACKGROUND

Application security (AppSec) has been addressed traditionally through the deployment of specialized products such as intrusion protection systems (IPSs), next generation firewall (NGFWs) and web application firewalls (WAFs) that typically focus on different layers of an attack surface and protocols. In general, both IPS and WAF products can be classified as rule-based protection approaches that require full traffic visibility in order to provide defense against known attacks. Another common characteristic that both IPS and WAF share is the resource-intensive requirements needed to run these functions (i.e., CPU, memory, and storage). These challenges (full traffic visibility and the resource-intensive requirements) present major obstacles to future cloud deployment of application security.

A typical deployment of the IPS/NGFW function is at the edge of a network, and thus only inbound and outbound traffic to/from a customer's network are visible in these deployments. This leaves many blind spots with regard to internal traffic within an enterprise network such as application-to-application (service/service). Even though it is theoretically possible to deploy IPS functionality in front of every application instance (or to divert all service/service traffic to the IPS function residing on the edge of the network), the price/performance impact and the need to optimize and create new IPS rules for service/service traffic renders such possibility impractical. These limitations become more problematic with cloud-based service, where the possibility of forwarding all the internal service/service traffic to the cloud service is simply not a realistic option.

While a typical WAF deployment may be closer to the applications being protected, deploying a WAF function in front of every application type suffers from similar issues with respect to price/performance, scaling, and rules optimization for every application type.

A challenge that both IPS and WAF struggle with stems from the fact that these functions are implemented as monolithic services that combine detection, analysis, and enforcement into one entity. Consequently, the extreme resource requirements and the need for full traffic visibility are the two main impediments to future cloud deployments.

DESCRIPTION OF EXAMPLE EMBODIMENTS

Overview

Presented herein are methodologies for implementing application security. The methodology includes generating an extraction vector based on a plurality of application security rules to be enforced; transmitting the extraction vector to a first agent operating on a first network device and to a second agent operating on a second network device; receiving, separately, from the first agent and from the second agent, first metadata generated by the first agent and second metadata generated by the second agent by applying, by the first agent and by the second agent, the extraction vector to network traffic passing, respectively, through the first network device and the second network device, the first metadata including a transaction ID that was assigned by the first agent, and the second metadata including the transaction ID which is maintained by the second agent; correlating the first metadata with the second metadata based on the transaction ID to construct a transactional service graph for the network traffic; and controlling at least one of the first agent and the second agent based on the transactional service graph.

A device or apparatus is also described. The device may include an interface unit configured to enable network communications, a memory, and one or more processors coupled to the interface unit and the memory, and configured to: generate an extraction vector based on a plurality of application security rules to be enforced, transmit the extraction vector to a first agent operating on a first network device and to a second agent operating on a second network device; receive, separately, from the first agent and from the second agent, first metadata generated by the first agent and second metadata generated by the second agent by applying, by the first agent and by the second agent, the extraction vector to network traffic passing, respectively, through the first network device and the second network device, the first metadata including a transaction ID that was assigned by the first agent, and the second metadata including the transaction ID which is maintained by the second agent, correlate the first metadata with the second metadata based on the transaction ID to construct a transactional service graph for the network traffic; and control at least one of the first agent and the second agent based on the transactional service graph.

Example Embodiments

Figure 1:
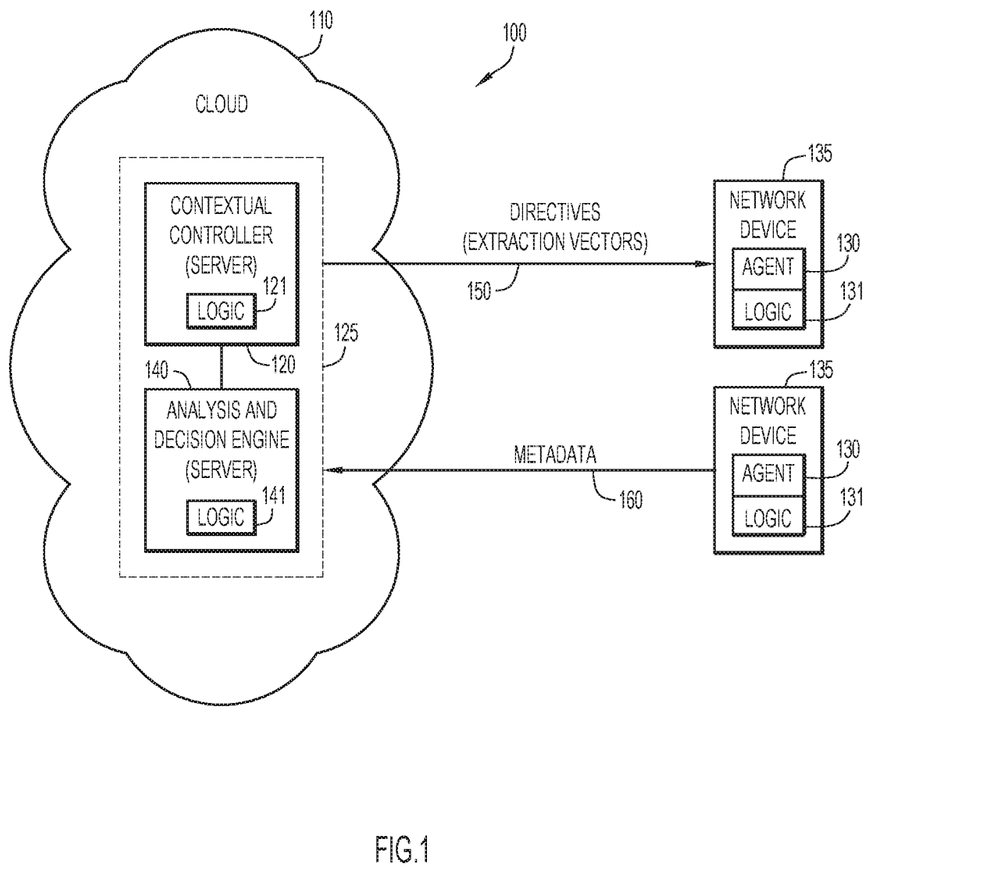
FIG. 1 shows a distributed runtime application security system in accordance with an example embodiment.

The embodiments described herein address the above challenges by introducing three separate/loosely-coupled components. Reference is made to FIG. 1, which shows a distributed runtime application security system 100 in accordance with an example embodiment. At a high level, the distributed runtime application security system (or, simply, "system") 100 includes a contextual controller 120 (e.g., a server) and an analysis and decision engine 140 (e.g., a server), which together may be implemented as a single entity 125, in a cloud 110, and agents 130 deployed on respective network devices 135. A network device 135 may be a server, router, switch, a pod, container, virtual machine, etc. Agent 130 may be logic or code that is deployed, and executes, on the network device 135. As will be explained, contextual controller 120 provides directives (also referred to as "extraction vectors") 150 to agents 130, and using directives 150, agents 130 generate metadata 160 that is passed back to analysis and decision engine 140. Aspects of distributed runtime application security system logic 121, 131, 141 may be hosted, respectively, by contextual controller 120, each agent 130, and analysis and decision engine 140.

As will be become apparent to those skilled in the art from the explanation below, the distributed runtime application security system 100 may eliminate the need for full packet visibility for attack detection/analysis. This is achieved through dynamic metadata extraction based on the presence of specific application(s) types behind agent 130. The system 100 also unifies the detection/extraction of metadata and enforcement functions into one agent 130 model. This eliminates the need for separate agents for IPS/IDS, WAF, and even machine learning (ML) directives. The system 100 still further unifies pattern matching and analysis engines into one cloud component, namely analysis and decision engine 140. This also eliminates the need for separate analysis engines for each service type (e.g., IPS/IDS and WAF), and minimizes the resources required for execution.

Contextual Controller 120

The role of contextual controller 120 is to derive the context about the applications running, e.g., on network devices 135 and control the agents 130 accordingly. The collection of instructions that enable agents 130 to extract useful information and perform any actions is referred to as directives 150. The context and directives 150 are derived based on various factors including:

a. Application types and associated vulnerabilities (note that the application in this context includes the OS type/version, runtime environment, open source components, custom app code, etc.);

b. Signatures/rules associated with known vulnerabilities from heterogeneous security sources;

c. Extraction rules associated with ML-based features;

d. Location of agents 130 and associated application(s) with each agent 130;

e. Existence of other agents 130 at different points of attachments/topology awareness, etc.);

f. Pre and post deployment updates (re-optimization based on deployment variables);

and g. Feedback from analysis and decision engine 140.

Using the derived context, the contextual controller 120 issues directives 150 for agents 130 in order to perform extraction of metadata 160 and enforcement (e.g., drop packets, block IP addresses, etc.).

More specifically, the functions of contextual controller 120 may be divided into two categories: (pre and peri/post deployment functions). Rules and associated extraction instructions (directives 150) are optimized based on the type of:

Application(s) present behind each agent 130 deployed and related application vulnerabilities;

Protection required (IPS/IDS/NGFW and WAF); and/or

Location of agents 130.

Pre-deployment functions of contextual controller 120 include:

a) Find all IPS/IDS and WAF rules applicable for each application/service type to be deployed. The applicable rules may be based on, e.g.:

Known vulnerabilities discovered through various techniques (e.g., Static Application Security Testing (SAST), Dynamic Application Security Testing (DAST), vulnerability scanners, pen test, etc.)

Application profile (including OS types, app types, languages/app frameworks, open source components, etc.). This data can be obtained from various sources in a development cycle The combination of application profile and associated vulnerabilities creates Application-Vector Application-Vector components are compared with full sets of IPS/IDS/NGFW and WAF signatures/rules Matching/relevant IPS and WAF rules are identified based on Application-vector components.

b) For each of the above rules, contextual controller 120 analyzes and assigns a performance penalty cost ("perf cost"). This process can be implemented as an offline process with results stored in a database or attached to the rule itself as a new field. The perf cost assignment is based on the computational complexity of the rule components. For instance, basic HTTP header matching, basic regular expression, and complex regular expression, may be assigned different weights based on the performance penalty required for execution. It is also possible to run/test each rule independently to quantify its performance impact under different traffic conditions and populate the perf cost accordingly.

c) Determine if some IPS/IDS and WAF rules address common vulnerabilities (e.g., different IPS and WAF rules for protection against the same common vulnerability and exposure (CVE)). If yes, determine least cost rules to be used based on perf cost.

d) Convert the final set of optimal rules (IPS/IDS+WAF) into extraction instructions for each application type.

e) Sort final rules and associated extraction instructions based on the severity level of the vulnerabilities being addressed. This allows network administrators/users to select: the minimum level of protection needed based on the severity levels of known vulnerabilities, and dynamic adjustment of protection level based on certain events (e.g., performance related triggers, current security posture/state, compliance scores, etc.).

Peri/Post-deployment functions of contextual controller 120 include:

f) Sending extraction instructions (directives 150) from contextual controller 120 to agents 130 may involve additional optimization based on where a given agent 130 happens to be deployed/attached to (i.e., optimization based on deployment topology). For example, if agent 130 is attached to a sidecar proxy, then the extraction instructions may be based on the vulnerabilities associated with only one type of application. The specific application type used in this case may be discovered through contextual controller 120 interactions with other systems (e.g., Kubernetes, Istio, or equivalent systems used by cloud providers). As another example, if agent 130 is attached to an edge proxy or NGFW, then the extraction instructions may be optimized based on other factors. For instance, within each virtual private cloud (VPC), if agent 130 is attachable to an NGFW or edge proxy, then the extraction instructions may be based on the applications present within that VPC. Given that some of these applications may have common vulnerabilities, the extraction instructions may be optimized to remove any overlapping elements. On the other hand, if agent 130 is attachable not only to an NGFW and edge proxy, but also to a sidecar proxy, then the extraction instructions may be optimized further, such that the instructions related to applications being protected with a side car proxy can be removed from the set of instructions to be sent for agents attached to an NGFW or edge proxy. This eliminates replication of extraction and analysis tasks to reduce both bandwidth and performance penalties.

g) Sending associated IPS/IDS and WAF rules from contextual controller 120 to analysis and decision engine 140 based on the above optimizations. That is, analysis and decision engine 140 is made aware of the protection rules to be applied on the metadata 160 generated by agents 130.

h) Any changes in the deployment topology can automatically trigger re-optimizations of items f) and g) above. Topology awareness is achieved through interactions between contextual controller 120 and extremal systems (e.g. cloud APIs, Kubernetes, ISTIO or other cloud configuration options).

Agent 130

Figure 2:
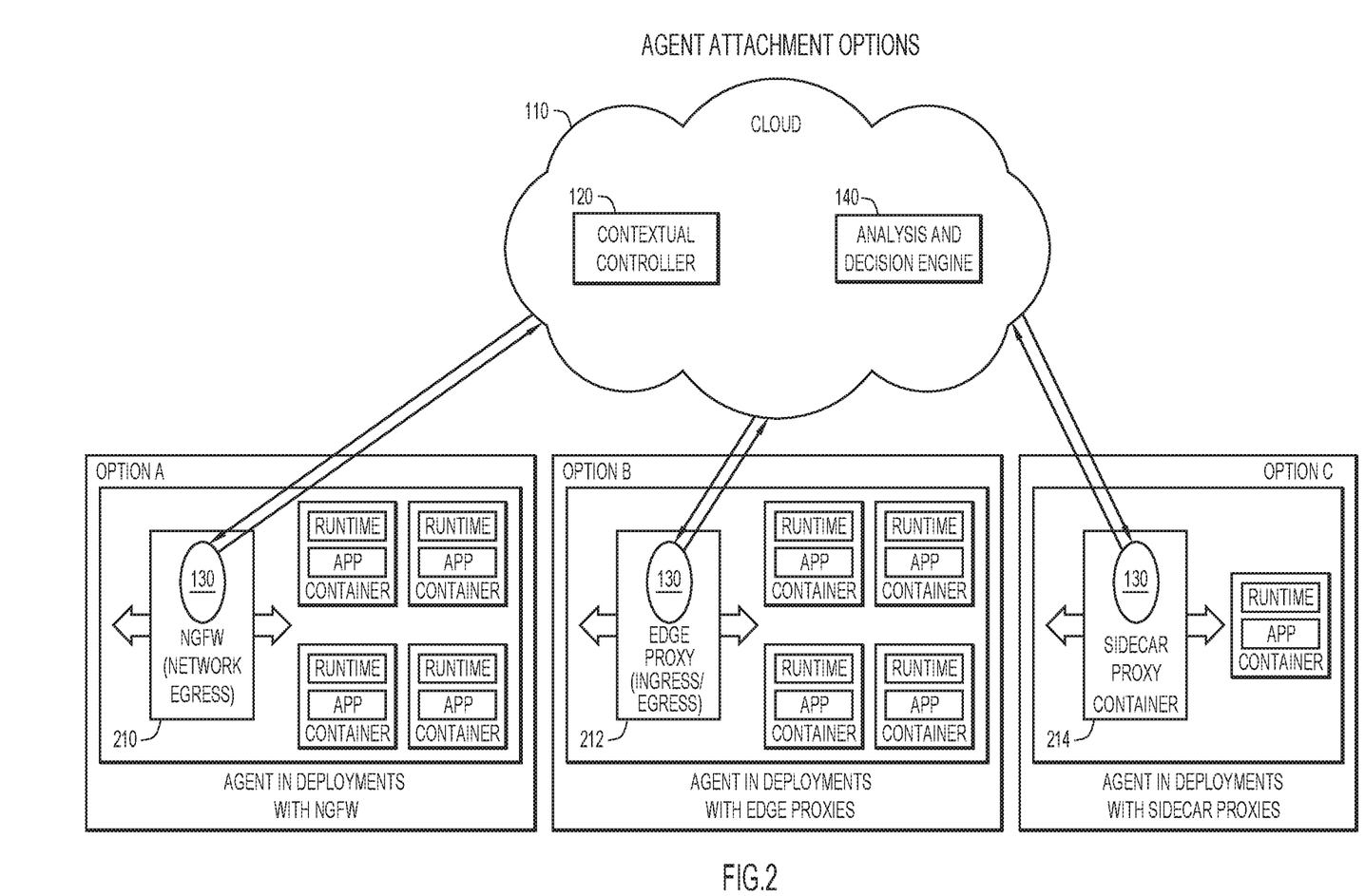
FIG. 2 shows how agents can be deployed in the distributed runtime application security system in accordance with an example embodiment.

FIG. 2 shows how agents 130 can be deployed in the distributed runtime application security system in accordance with an example embodiment. As suggested above, agent 130 can be deployed in connection with a NGFW 210, an edge proxy 212 and/or a sidecar proxy 214.

In an embodiment, the distributed extraction and enforcement functions provided by agents 130 are independent of the security functions provided by, e.g. IPS/IDS/NGFW, WAF, in order to allow for a single agent model to be used for any/all of these technologies. That is, the extraction and enforcement instructions (directives 150) received from contextual controller 120 and analysis could be related to IPS/IDS/NGFW rules, WAF rules, or any combinations thereof, but agents 130 do not need to be aware of the security service type provided or the associated workload(s) being protected.

The various attachment options, as shown in FIG. 2, for agents 130 allow visibility/control of applications in most deployment models, and for various traffic types including: user-service, service-service, and service to external resources. This may eliminate the need to divert all packets of interest to analysis and decision engine 140. Instead, only relevant metadata 160 is forwarded in order to reduce both bandwidth and processing requirements.

An agent 130 may have the following functions:

Receive and process directives 150 from contextual controller 120.

Receive and execute code from contextual controller 120 or analysis and decision engine 140 (i.e., code to be executed in/by agent 130). This option may be reserved for special use cases, where advanced extraction/enforcement functions cannot be expressed in simple extraction instructions.

Extract relevant metadata based on received instructions or code (with optional preprocessor validation for faster local decisions).

Forward relevant metadata 160 to analysis and decision engine 140 with specific tags (e.g., agent 130 instance ID) to facilitate identification of source at analysis and decision engine 140.

Obfuscate selected data fields based on a customer's or regulations-based policies (e.g. credit card numbers, Social Security numbers, personal identification information (PII), Personal health information (PHI), etc.). One-way hash function or optional local store of original fields with encryption (using public keys) may be used for this purpose. Associated private keys are tightly controlled and not shared with any agent 130 instance (i.e., once the sensitive data is encrypted and stored even the agent 130 instance cannot decrypt).

Receive and process enforcement instructions/code from analysis and decision engine 140. Analysis and decision engine 140 is configured to generate a security verdict (e.g., allow, block, offload flow) associated with specific flow/metadata (typically dependent on the rule type). In some cases, this security verdict may be reached after analyzing only a few metadata samples of a flow. Once a security verdict is reached, the associated agent 130 instance may be instructed to perform one of the following to eliminate sending metadata that is no longer of interest: (1) stop sending metadata related to specific flow, and either block or allow the rest of the flow to pass through. Relevant statistics may be captured locally at agent 130 and reported, at the end of a session, to analysis and decision engine 140; (2) stop sending metadata related to specific flow, but continue to monitor locally at agent 130 with specific functions to, e.g., perform basic light-weight pattern matching functions (if offload with inspection is specified), auto-trigger to bypass offload (i.e., resume extraction of metadata) based on specified thresholds (e.g., time-based, timeout, HTTP headers changes, etc.); (3) if local offload function drops packets, then metadata 160 with cause-of-drop decision may be transmitted to analysis and decision engine 140 (e.g., rate limit, header malformed, etc.). Agent 130 may also be configured to collect flow statistics and report at the end of the session or when offload bypass is triggered.

Agents 130 may also be configured to synchronize clock/timestamp accuracy in metadata.

In one embodiment, described more fully later herein, the system 100 implements transactional awareness by, e.g., tagging traffic on ingress to correlate with associated transactions on egress. The tag (trans_ID, timestamp, latency, hash, etc.) may be inserted by a first agent 130 instance to encounter, e.g., HTTP, traffic without such a tag. Other agent 130 instances encountering the tagged traffic (e.g., in a service path) may modify the timestamp/latency fields but carry forward the same trans_ID field without modifications. This data (transactional latencies per agent 130 instance and across agent 130 instances in a microservices path) can be includes in the metadata 160 to facilitate new types of IPS/WAF rules based on the transactional awareness across instances. In addition, the same data can be used for APM (application performance monitoring) and for performance deviations monitoring of various app types from norm. This deviation, depending on significance, can be used as an indicator of compromise (IOC). The tag may also include a hash of specific HTTP headers or fields such that changes to such fields can also be used as an IOC. This can also be used to create new IPS/WAF rule types that are not currently possible.

Examples of programmable metadata extraction instructions include, for example:

Selective or all HTTP headers/methods

HTTP headers+partial/full payload.

Streams within sessions (i.e. multiplexed HTTP2/QUIC).

Aggregated metadata rather than per frame updates to save bandwidth/processing overhead (i.e. 16K/32K chunks of metadata 160).

Metadata 160 may include the following information: agent 130 instance ID, Extraction rule ID (optional header used with rule offload function), Associated Flow ID (e.g., random numbers assigned by each agent 130 instance; local significance to each agent 130 instance), Associated Transaction ID (significant across multiple agent 130 instances involved in a service path, assigned by first agent 130 instance to tag the HTTP transaction (i.e., head of path), and carried forward by other agent 130 instances), Transactional latencies: within this agent 130 instance, previous agent 130 instance encountered so far, Counters, timestamps, flow-based inter-arrival latency, metadata (per contextual controller 120 instructions): HTTP methods (request, response, . . . ).

Analysis and Decision Engine 140

Figure 3:
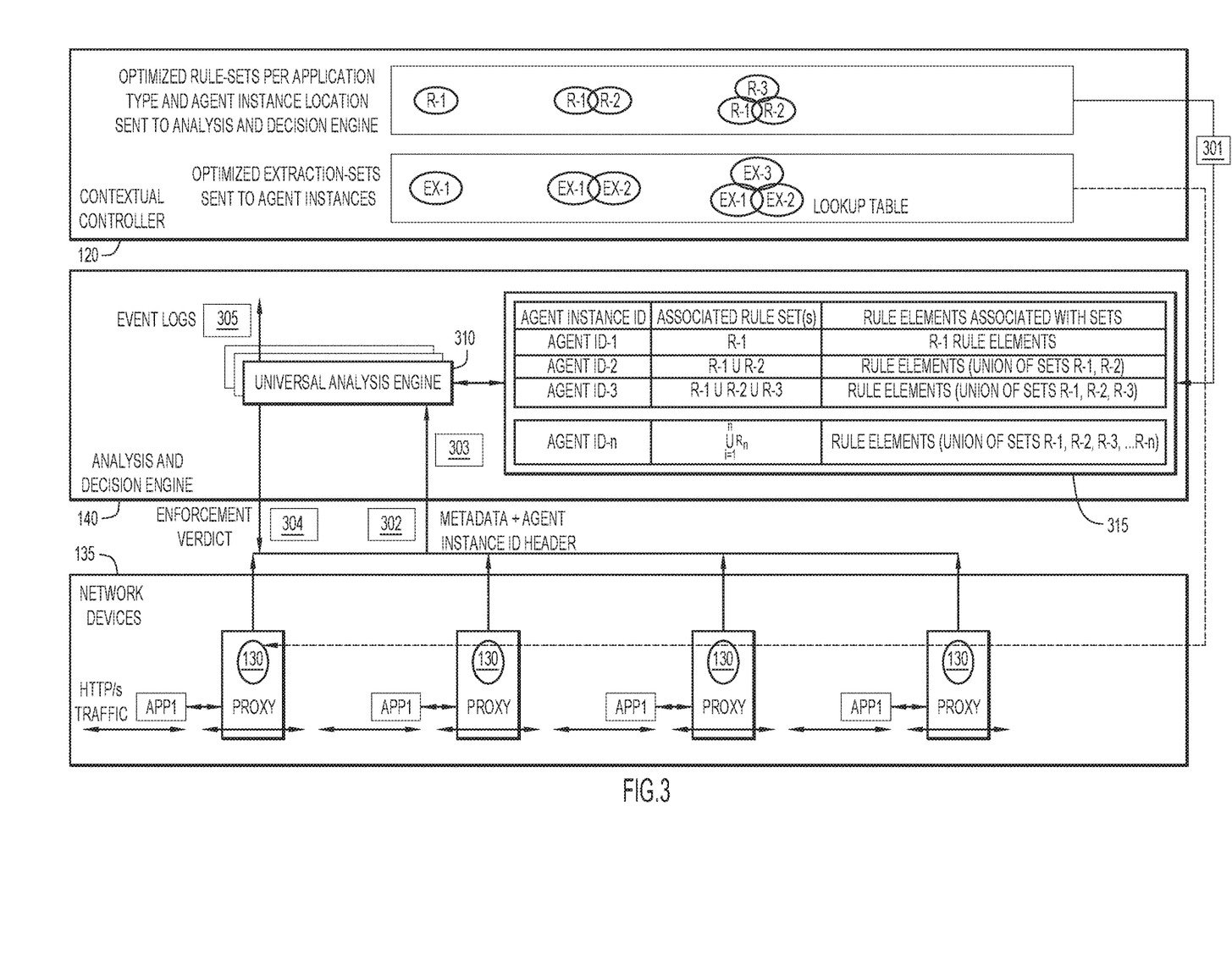
FIG. 3 shows how an analysis and decision engine interacts with other components in the distributed runtime application security system in accordance with an example embodiment.

FIG. 3 shows how analysis and decision engine 140 interacts with other components in the distributed runtime application security system 100 in accordance with an example embodiment. As shown, analysis and decision engine 140 may include universal pattern matching (analysis) engines 310 that eliminate the need for different analysis engines for IPS and WAF functions (e.g., eliminates the need to have separate Snort+Modesec engines). Furthermore, universal analysis engines 310 may be optimized to perform pattern matching/regular expression matching on, e.g., metadata only, thus eliminating the need to forward full packets to the analysis and decision engine 140.

Analysis and decision engine 140 may operate as follows. At operation 301, prior to analysis and decision engine 140 receiving any metadata from agent 130 instances, contextual controller 120 updates a rules lookup table 315 accessible by analysis and decision engine 140. The update includes, e.g., each agent 130 instance ID and associated rule subsets (R1 to Rn). Any overlapping rule elements within these subsets may be eliminated by performing union of sets function. At the same time, contextual controller 120 may also update all agent 130 instances with the associated extraction subsets (EX-1 to EX-n), extraction vectors, i.e., directives 150.

At operation 302, agent 130 instances produce metadata extractions per operation 301 instructions and append headers as described above.

At operation 303, universal analysis engines 310 receive metadata from agent 130 instances and perform a lookup based on the agent 130 instance ID. The relevant rules to be applied to metadata received from a given agent 130 instance are extracted from the lookup table and cached (to minimized lookup overhead for subsequent metadata). The universal analysis engines 310 can be configured to process metadata from multiple/all agent 130 instances, or be dedicated to specific agent 130 instances which may be implemented in, e.g., selected multitenancy use cases.

At operation 304, once the analysis and decision engine 140 detects a vulnerability associated with the applied rules, the associated agent 130 instance may be updated with the appropriate enforcement action (e.g., drop, capture, offload, etc.).

At operation 305, security logs associated with each event detected in operation 304 may be logged with the specific rule matched, specific agent 130 instance (and associated application(s) based on the agent 130 instance attachment scenario, timestamps, and associated transactional delays.

Figure 4:
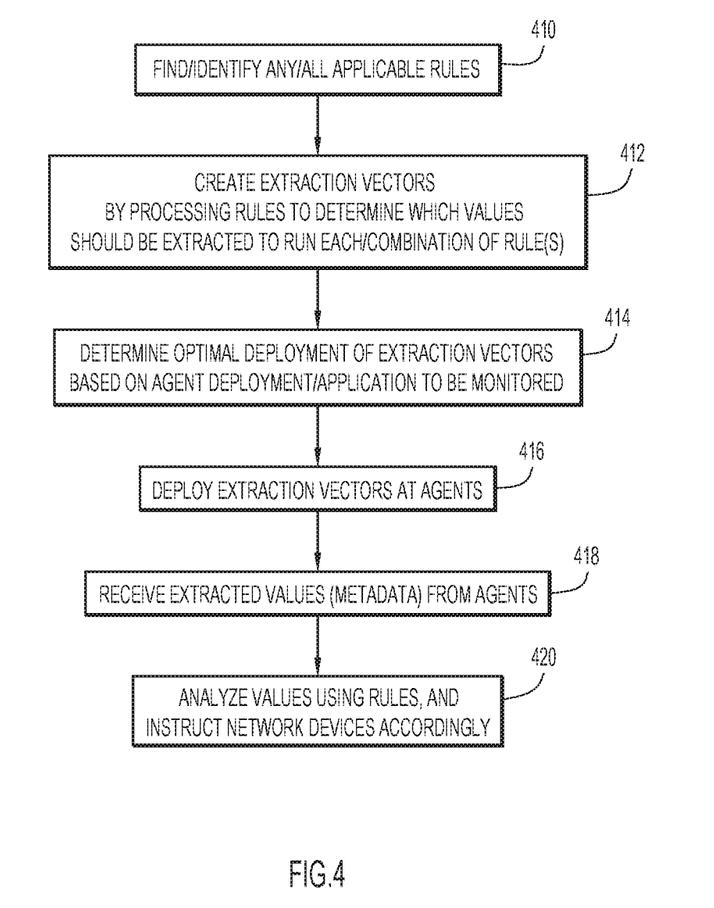
FIG. 4 shows a series of operations that may be performed by elements of the distributed runtime application security system in accordance with an example embodiment.

FIG. 4 shows a series of operations that may be performed by elements of the distributed runtime application security system 100 in accordance with an example embodiment. In this case, the operations may be performed in cloud 110 by a combination of contextual controller 120 and analysis and decision engine 140, i.e., single entity 125. At 410, system logic finds/identifies any/all applicable rules that might be of interest to apply to traffic in a given network for application security. At 412, system logic creates extraction vectors (directives 150) by processing the rules to determine which values/fields should be extracted from network traffic to run each/combination of rule(s). At 414, system logic determines optimal deployment of extraction vectors on respective agents, based, e.g., on agent deployment scenario and application to be monitored. At 416, system logic deploys extraction vectors (e.g., directives 150) at the agents. At 418, system logic receives extracted values (e.g., metadata 160) from the agents, and at 420, analyzes values (metadata) using the rules. The logic may further instruct network devices accordingly (e.g., allow, block, offload flow, etc.) directly or via agents 130.

Transactional Awareness

A goal of the distributed runtime application security system 100 described herein is to learn, monitor, and enforce valid/suspicious/invalid transactional service graphs that a particular request may produce across service domains, services within clusters, and across layers within each service/application.

As a service request enters a cluster of services, there are many different possible transaction paths that such a request can trigger depending on numerous factors including the type of the initial request (e.g., HTTP request with certain parameters, such as requesting a specific object), the processing logic of the initial service (or application) encountered and the resulting transactions, the subsequent processing of the resulting transactions by other services within the cluster, and/or interactions with other external services (e.g. other service clusters).

From a security perspective, tracking/enforcing inter and intra-service interactions with transactional awareness across all these layers is important to address future deployment models (this is especially true for microservices and various service mesh models).

Figure 5:
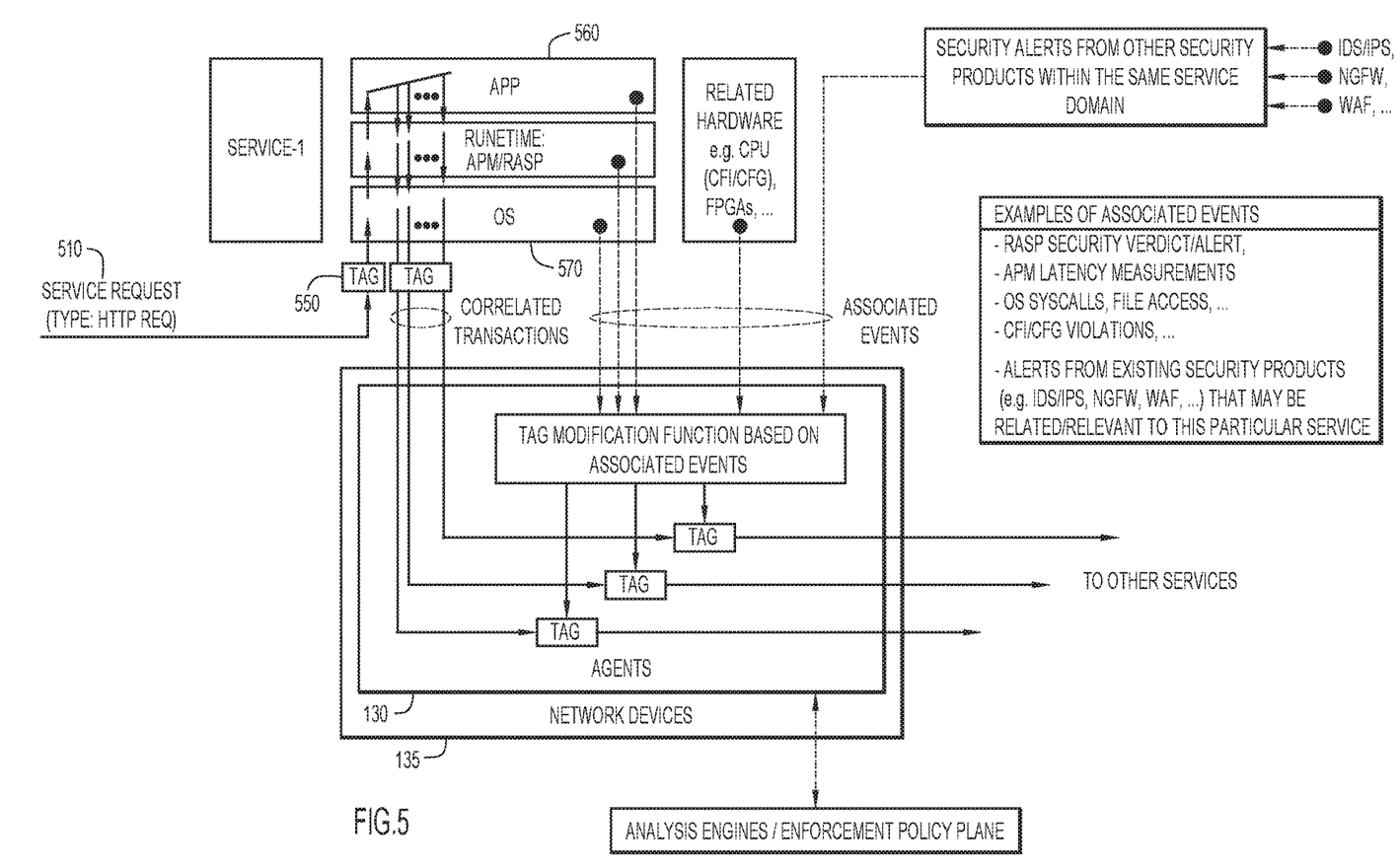
FIG. 5 shows the use of tagging to provide transactional awareness to generate a transaction graph in the distributed runtime application security system in accordance with an example embodiment.

FIG. 5 shows the use of tagging to provide transactional awareness to generate a transaction graph in accordance with an example embodiment. As shown, a service request 510 entering a service construct is tagged/tracked as early as possible by the first agent 130 instance it encounters, and is continuously tracked/updated/enforced thereafter by other agent 130 instances along the path. The correlation between the service request 510 and all the resulting transactions at various layers in the service may be useful to establish a security baseline for normal/suspicious/malicious detection and enforcement. Such correlation can be achieved by adding a tag with a unique transaction ID (along with other fields) to allow instrumentation at the application or runtime environment to append this tag to all correlated transactions. In addition to the unique transaction ID, the tag may include other fields that may be appended by the various services encountered along the path in order to carryover relevant parameters that enable detection/enforcement at subsequent services. The additional fields in the tag may include the following:

Transaction ID;

Initial Transaction type (e.g. HTTP request, SQL query), parameters/metadata within transaction (e.g. User, file object), and transaction type from previous instance;

initial service domain; last service domain;

Previous service instance visited (graph vertex); and/or

Previous latency per service hop, and accumulated latency since initial transaction.

In order to apply cross-correlations, additional filters to allow grouping, i.e., a group ID, may be applied over the metadata observed. An example of the Group ID is a user.

If each transition between the nodes is represented by an edge, an entire chain of events from the initial transaction represents a graph walk. The set of valid transaction path is learned by observing the flow of the transaction ID, as well as all the additional vertices. Any deviation from the valid transaction graph walks may be considered a security incident.

There are additional graphs that may share common group IDs, but have multiple transactions. This allows additional relationships between transaction graphs.

As shown in FIG. 5, an application 560 may handle a (HTTP) service request 510. The application 560 processes these service requests 510, and in turn generates other requests to the underlying operating system, and external services, such as file access. There may also be additional requests that are sent to other services in order to complete the original request.

Service request 510 is tagged with a tag 550 with a transaction ID. Application 560 places the transaction ID in all the other requests that are generated during the processing of this service request 510. This transaction ID is observed by agents 130 that are placed at the OS Layer 570, and the underlying application execution.

Associated events that may also be included in the TAG extension include:
OS system calls, file access activities;
Runtime Application Self Protection Agents, that generate meta-data, including the transaction ID observed; and/or
Alerts from existing security products (e.g. IDS/IPS, NGFW, WAF) that may be related/relevant to this particular service, to include source of alert, severity level, service domain. This will also observe the transaction ID.

A group ID filter may also applied. In this example, a group ID filter is the user ID that may be using this service. The group ID filter set to the user enables all the associated transactions from the user to be observed.

The metadata collected from this application soon generates transaction graphs. After a learning period, the system learns the valid graph walks. The graph walks may also be grouped by the group ID(s). The graphs may also informed by the associated metadata.

Consider an attack that is leveraging a valid user. This valid user may now be trying to exploit the system in the following ways: 1) possible injection into the Operating System to execute a command, 2) possible request to another external service, or 3) extracting additional data from memory/files.

Each of the above scenarios will result in additional graph walks, which, based on prior expected graph walks, would be considered not valid for this combination of user and application.

In one possible implementation, agents 130 can embed security verdicts in the tags (referred to as "associated events" in FIG. 5). With this additional information, agents 130 downstream of a first agent 130 may use the tag to modify the extraction function to enable more or less aggressive extraction depending on the security verdicts reached by previous agents 130 along the path.

Further, agents 130 may interact with other agents (e.g., runtime application self-protection (RASP) agents/application performance monitoring (APM) agents, runtime environment agents, etc.) to correlate transactions that may not be inherently relatable. For example, an HTTP request sent to a particular application may generate many related SQL queries and HTTP requests that may not be easily relatable by agents 130 without interactions with other agents (e.g. RASP/APM).

Figure 6:
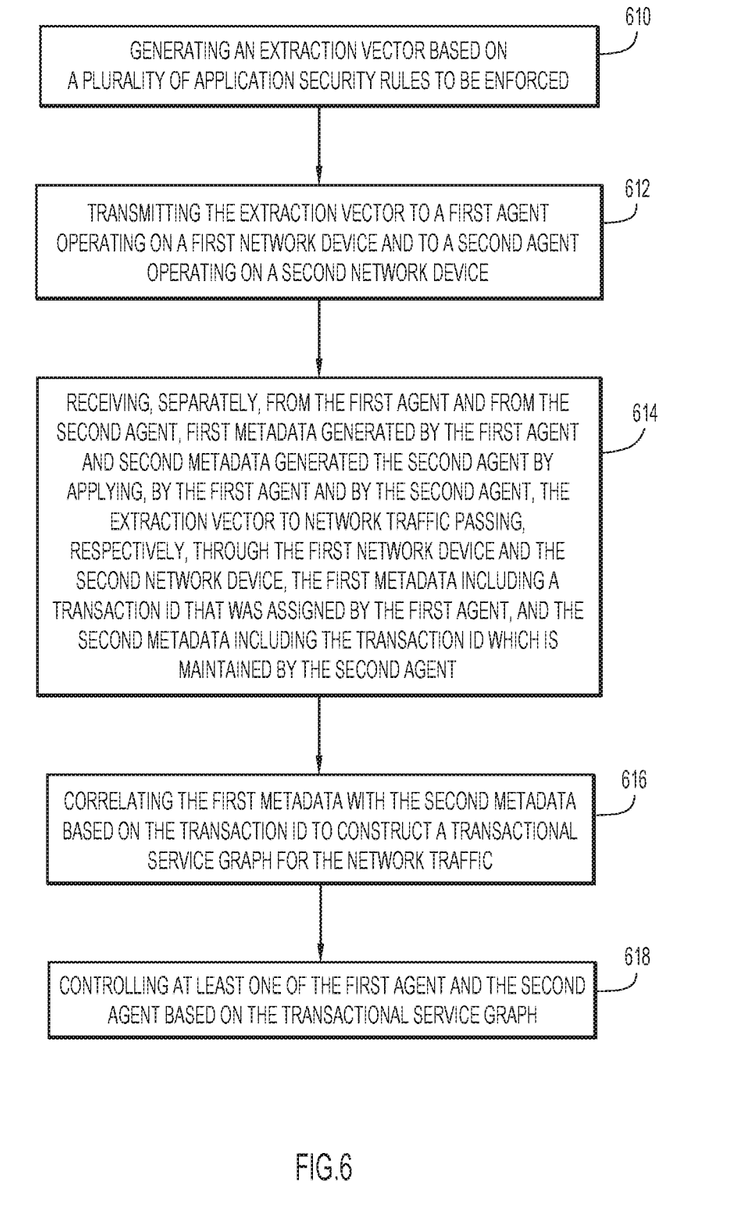
FIG. 6 is a flow chart illustrating a series of operations for operating the distributed runtime application security system in accordance with an example embodiment.

FIG. 6 is a flow chart illustrating a series of operations for operating the distributed runtime application security system in accordance with an example embodiment. In accordance with an embodiment logic hosted by contextual controller 120 and analysis and decision engine 140, and/or agents 130 may be configured to execute the indicated operations. At 610, the logic is configured to generate an extraction vector based on a plurality of application security rules to be enforced. At 612, the logic is configured to transmit the extraction vector to a first agent operating on a first network device and to a second agent operating on a second network device. At 614, the logic is configured to receive, separately, from the first agent and from the second agent, first metadata generated by the first agent and second metadata generated the second agent by applying, by the first agent and by the second agent, the extraction vector to network traffic passing, respectively, through the first network device and the second network device, the first metadata including a transaction ID that was assigned by the first agent, and the second metadata including the transaction ID which is maintained by the second agent. At 616, the logic is further configured to correlate the first metadata with the second metadata based on the transaction ID to construct a transactional service graph for the network traffic. And, at 618, the logic is configured to control at least one of the first agent and the second agent based on the transactional service graph.

Figure 7:
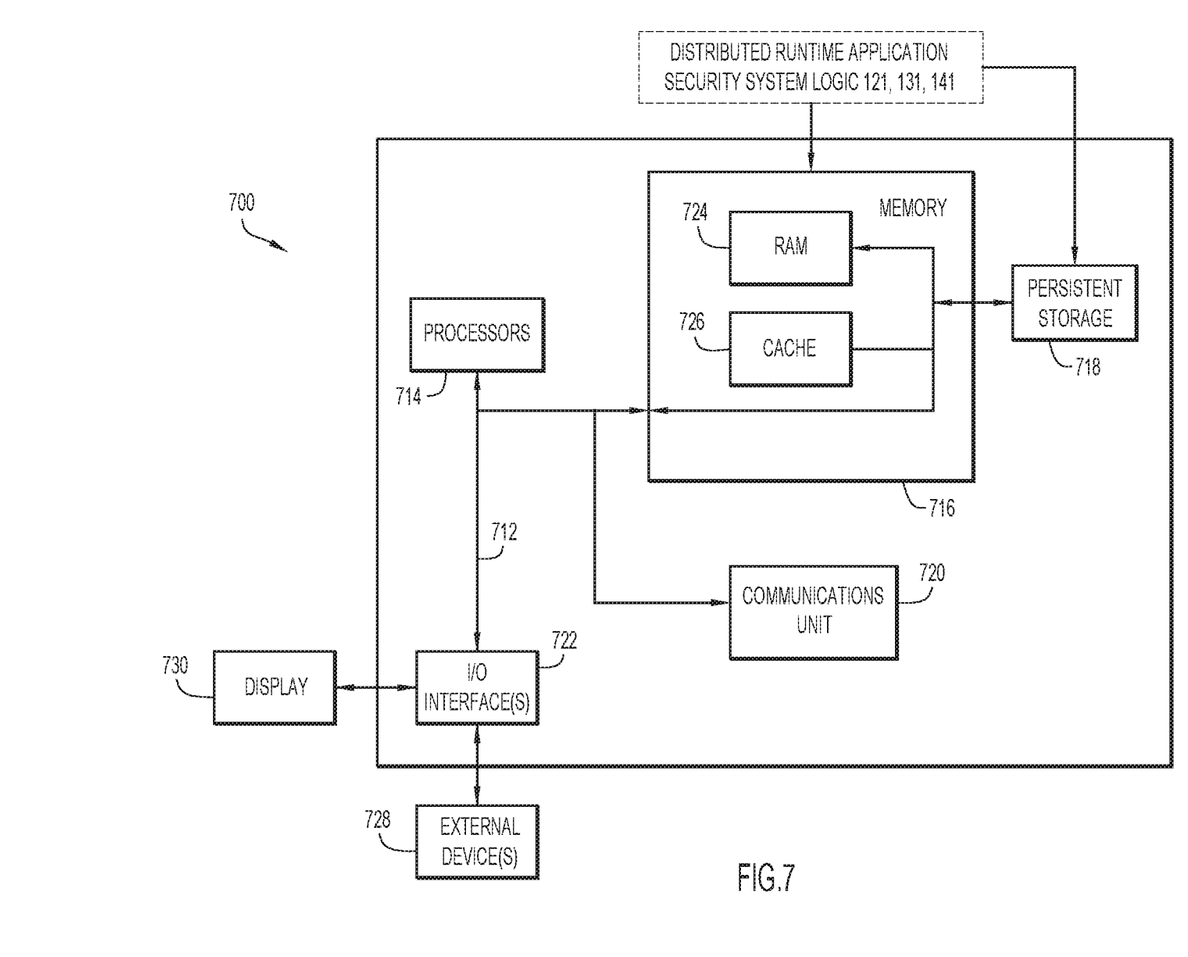
FIG. 7 depicts a device (e.g., a server, or network device) that executes logic to perform the operations of the distributed runtime application security system in accordance with an example embodiment.

FIG. 7 depicts a device (e.g., a server, or a network device) that executes logic (e.g., 121, 131, 241) to perform the operations of distributed runtime application security system in accordance with an example embodiment. It should be appreciated that FIG. 7 provides only an illustration of one embodiment and does not imply any limitations with regard to the environments in which different embodiments may be implemented. Many modifications to the depicted environment may be made. Indeed, in many implementations of a server or network device configured to host appropriate logic, much of the hardware described below may not be needed.

As depicted, the device 700 includes a bus 712, which provides communications between computer processor(s) 714, memory 716, persistent storage 718, communications unit 720, and input/output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media. In the depicted embodiment, memory 716 includes random access memory (RAM) 724 and cache memory 726. In general, memory 716 can include any suitable volatile or non-volatile computer readable storage media. Instructions for appropriate logic may be stored in memory 716 or persistent storage 718 for execution by processor(s) 714.

One or more programs may be stored in persistent storage 718 for execution by one or more of the respective computer processors 714 via one or more memories of memory 716. The persistent storage 718 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems or devices. In these examples, communications unit 720 includes one or more network interface cards. Communications unit 720 may provide communications through the use of either or both physical and wireless communications links.

I/O interface(s) 722 allows for input and output of data with other devices that may be connected to computer device 700. For example, I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided. The method includes generating an extraction vector based on a plurality of application security rules to be enforced; transmitting the extraction vector to a first agent operating on a first network device and to a second agent operating on a second network device; receiving, separately, from the first agent and from the second agent, first metadata generated by the first agent and second metadata generated by the second agent by applying, by the first agent and by the second agent, the extraction vector to network traffic passing, respectively, through the first network device and the second network device, the first metadata including a transaction ID that was assigned by the first agent, and the second metadata including the transaction ID which is maintained by the second agent; correlating the first metadata with the second metadata based on the transaction ID to construct a transactional service graph for the network traffic; and controlling at least one of the first agent and the second agent based on the transactional service graph.

The method may further include generating the extraction vector by considering an application behind each of the first agent and the second agent.

The method still further include generating the extraction vector by considering a deployment implementation for the first agent and the second agent.

The method may also include generating the extraction vector by considering a performance penalty cost associated with receiving the first metadata and the second metadata.

In an embodiment, the transaction ID is part of a tag applied by the first agent to a service request that is received at the first network device. The tag may include an indication of an initial transaction type, an initial service domain and a last service domain, at least one of a previous latency per service hop, and an accumulated latency since initial transaction of the service request, and/or a security verdict added by the first agent The method also include applying a group ID to the first metadata and the second metadata.

In another form, a device may also be provided in accordance with an embodiment. The device may include an interface unit configured to enable network communications; a memory; and one or more processors coupled to the interface unit and configured to: generate an extraction vector based on a plurality of application security rules to be enforced; transmit the extraction vector to a first agent operating on a first network device and to a second agent operating on a second network device; receive, separately, from the first agent and from the second agent, first metadata generated by the first agent and second metadata generated by the second agent by applying, by the first agent and by the second agent, the extraction vector to network traffic passing, respectively, through the first network device and the second network device, the first metadata including a transaction ID that was assigned by the first agent, and the second metadata including the transaction ID which is maintained by the second agent; correlate the first metadata with the second metadata based on the transaction ID to construct a transactional service graph for the network traffic; and control at least one of the first agent and the second agent based on the transactional service graph.

The one or more processors may be further configured to generate the extraction vector by considering an application behind each of the first agent and the second agent.

The one or more processors may be further configured to generate the extraction vector by considering a deployment implementation for the first agent and the second agent.

The one or more processors may be further configured to generate the extraction vector by considering a performance penalty cost associated with receiving the first metadata and the second metadata.

In an embodiment, the transaction ID may be part of a tag applied by the first agent to a service request that is received at the first network device. The tag may include an indication of an initial transaction type.

In still another form, a non-transitory computer readable storage media is provided that is encoded with instructions that, when executed by a processor, cause the processor to generate an extraction vector based on a plurality of application security rules to be enforced; transmit the extraction vector to a first agent operating on a first network device and to a second agent operating on a second network device; receive, separately, from the first agent and from the second agent, first metadata generated by the first agent and second metadata generated by the second agent by applying, by the first agent and by the second agent, the extraction vector to network traffic passing, respectively, through the first network device and the second network device, the first metadata including a transaction ID that was assigned by the first agent, and the second metadata including the transaction ID which is maintained by the second agent; correlate the first metadata with the second metadata based on the transaction ID to construct a transactional service graph for the network traffic; and control at least one of the first agent and the second agent based on the transactional service graph.

The instructions, when executed by a processor, may cause the processor to generate the extraction vector by considering an application behind each of the first agent and the second agent.

The instructions, when executed by a processor, may cause the processor to generate the extraction vector by considering a deployment implementation for the first agent and the second agent.

The instructions, when executed by a processor, may cause the processor to generate the extraction vector by considering a performance penalty cost associated with receiving the first metadata and the second metadata.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   generating an extraction vector based on a plurality of application security rules to be enforced;
   transmitting the extraction vector to a first agent operating on a first network device and to a second agent operating on a second network device;
   receiving, separately, from the first agent and from the second agent, first metadata generated by the first agent and second metadata generated by the second agent by applying, by the first agent and by the second agent, the extraction vector to network traffic passing, respectively, through the first network device and the second network device, the first metadata including a transaction ID that was assigned by the first agent, and the second metadata including the transaction ID which is maintained by the second agent;

correlating the first metadata with the second metadata based on the transaction ID to construct a transactional service graph for the network traffic; and controlling at least one of the first agent and the second agent based on the transactional service graph, wherein the first agent is configured to instruct the second agent to modify the extraction vector into a modified extraction vector, the method further comprising receiving from the second agent third metadata generated by applying the modified extraction vector to the network traffic.

2. The method of claim 1, further comprising generating the extraction vector by considering an application behind each of the first agent and the second agent.

3. The method of claim 1, further comprising generating the extraction vector by considering a deployment implementation for the first agent and the second agent.

4. The method of claim 1, further comprising generating the extraction vector by considering a performance penalty cost associated with receiving the first metadata and the second metadata.

5. The method of claim 1, wherein the transaction ID is part of a tag applied by the first agent to a service request that is received at the first network device.

6. The method of claim 5, wherein the tag further comprises an indication of an initial transaction type.

7. The method of claim 5, wherein the tag further comprises an initial service domain and a last service domain.

8. The method of claim 5, wherein the tag further comprises at least one of a previous latency per service hop, and an accumulated latency since initial transaction of the service request.

9. The method of claim 5, wherein the tag comprises a security verdict added by the first agent.

10. The method of claim 1, further comprising applying a group ID to the first metadata and the second metadata.

11. A device comprising:
an interface unit configured to enable network communications;
a memory; and
one or more processors coupled to the interface unit and the memory, and configured to:
generate an extraction vector based on a plurality of application security rules to be enforced;
transmit the extraction vector to a first agent operating on a first network device and to a second agent operating on a second network device;
receive, separately, from the first agent and from the second agent, first metadata generated by the first agent and second metadata generated by the second agent by applying, by the first agent and by the second agent, the extraction vector to network traffic passing, respectively, through the first network device and the second network device, the first metadata including a transaction ID that was assigned by the first agent, and the second metadata including the transaction ID which is maintained by the second agent;
correlate the first metadata with the second metadata based on the transaction ID to construct a transactional service graph for the network traffic; and
control at least one of the first agent and the second agent based on the transactional service graph,
wherein the first agent is configured to instruct the second agent to modify the extraction vector into a modified extraction vector, and wherein the one or more processors are configured to receive from the second agent third metadata generated by applying the modified extraction vector to the network traffic.

12. The device of claim 11, wherein the one or more processors are further configured to generate the extraction vector by considering an application behind each of the first agent and the second agent.

13. The device of claim 11, wherein the one or more processors are further configured to generate the extraction vector by considering a deployment implementation for the first agent and the second agent.

14. The device of claim 11, wherein the one or more processors are further configured to generate the extraction vector by considering a performance penalty cost associated with receiving the first metadata and the second metadata.

15. The device of claim 11, wherein the transaction ID is part of a tag applied by the first agent to a service request that is received at the first network device.

16. The device of claim 15, wherein the tag further comprises an indication of an initial transaction type.

17. A non-transitory computer readable storage media encoded with instructions that, when executed by a processor, cause the processor to:
generate an extraction vector based on a plurality of application security rules to be enforced;
transmit the extraction vector to a first agent operating on a first network device and to a second agent operating on a second network device;
receive, separately, from the first agent and from the second agent, first metadata generated by the first agent and second metadata generated by the second agent by applying, by the first agent and by the second agent, the extraction vector to network traffic passing, respectively, through the first network device and the second network device, the first metadata including a transaction ID that was assigned by the first agent, and the second metadata including the transaction ID which is maintained by the second agent;
correlate the first metadata with the second metadata based on the transaction ID to construct a transactional service graph for the network traffic; and
control at least one of the first agent and the second agent based on the transactional service graph,
wherein the first agent is configured to instruct the second agent to modify the extraction vector into a modified extraction vector, and wherein the instructions cause the processor to receive from the second agent third metadata generated by applying the modified extraction vector to the network traffic.

18. The non-transitory computer readable storage media of claim 17, wherein the instructions, when executed by a processor, cause the processor to generate the extraction vector by considering an application behind each of the first agent and the second agent.

19. The non-transitory computer readable storage media of claim 17, wherein the instructions, when executed by a processor, cause the processor to generate the extraction vector by considering a deployment implementation for the first agent and the second agent.

20. The non-transitory computer readable storage media of claim 17, wherein the instructions, when executed by a processor, cause the processor to generate the extraction vector by considering a performance penalty cost associated with receiving the first metadata and the second metadata.

* * * * *